United States Patent
Hsieh et al.

(10) Patent No.: US 7,552,292 B2
(45) Date of Patent: Jun. 23, 2009

(54) METHOD OF MEMORY SPACE CONFIGURATION

(75) Inventors: Bo-Wei Hsieh, Hsin-Tien (TW); Ming-Shi Liou, Hsin-Tien (TW)

(73) Assignee: Via Technologies, Inc., Hsin-Tien (TW)

( * ) Notice: Subject to any disclaimer, the term of this patent is extended or adjusted under 35 U.S.C. 154(b) by 475 days.

(21) Appl. No.: 11/082,686

(22) Filed: Mar. 17, 2005

(65) Prior Publication Data

US 2006/0095694 A1    May 4, 2006

(51) Int. Cl.
*G06F 12/00* (2006.01)

(52) U.S. Cl. ............... 711/157; 711/127; 711/E12.001; 711/E12.079

(58) Field of Classification Search ............... 711/157, 711/127, E12.001, E12.079
See application file for complete search history.

(56) References Cited

U.S. PATENT DOCUMENTS 5,664,160 A    9/1997    Fecteau et al.

*Primary Examiner*—Hyung S Sough
*Assistant Examiner*—Mehdi Namazi
(74) *Attorney, Agent, or Firm*—Thomas, Kayden, Horstemeyer & Risley

(57) ABSTRACT

A method is disclosed for utilizing at least one bit within the logical address code of a memory unit formed by Dynamic Random Access Memory (DRAM) to be the control code for interleaving the memory space to different memory ranks. First, the distributive rule of the data is defined. Next, the data is distributed to the memory ranks that the data belongs to according to the rule. Then, the data is physically accessed in one of the memory ranks.

17 Claims, 4 Drawing Sheets

METHOD OF MEMORY SPACE CONFIGURATION

RELATED APPLICATIONS

The present application is based on, and claims priority from, Taiwan Application Serial Number 93133093, filed on Oct. 29, 2004, the disclosure of which is hereby incorporated by reference herein in its entirety.

BACKGROUND

1. Field of Invention

The present invention relates to a method for accessing a memory system. More particularly, the present invention relates to an access method used to enhance the throughput by interleaving a multi-rank memory system.

2. Description of Related Art

Generally, data access systems nowadays include a memory unit, and some of the memory units are designed as multi-rank for expanding the memory space in the future. These memory ranks share the same single system bus.

A memory page is a basic unit of a memory access. A memory page should be activated before reading operation, and then a reading command is asserted to the memory after passing some clock cycles. After the memory received the command, the memory waits for a span of time then the desired data can be accessed, where the span of time is so-called latency. It spends many clock cycles between activating a memory page and accessing the data. If the next desired data is in the same memory page with the present accessed data, time of activating memory page can be saved; furthermore, the pipeline schedule can be fully utilized for enhancing the efficiency of the system bus. In contrast, if the next desired data is not in the same memory page with the present accessed data, the activated memory page should be firstly pre-charged and then the another memory page allocating to the next desired data is activated. After spending lots of clock cycles for asserting the accessing command and after waiting for the latency, then the data is ready to be accessed. However, the data bus is idle during those clock cycles and latency, as a result, the data access system is inefficient.

FIG. 1 shows the condition described above. The access cycle 102 is total clock duration for accessing the first data. As shown in FIG. 1, when accessing a first data, the system spends two clock cycles for activating a page, and spends three clock cycles and two clock cycles respectively for waiting latency and accessing the data after asserting a data accessing command. Assuming the following second data which needs to be accessed after the first data is in the different memory page with the first data, the memory page allocating to the first data is pre-charged and the another memory page allocating to the second data is activated. Similarly, an access cycle 104 identical with the access cycle 102 is spent for accessing the second data. In this example, the system spends total nine clock cycles for accessing the second data, and most of the time is spent on the activating and pre-charging.

SUMMARY

The present invention provides a memory interleaving method in a memory unit with multi-rank.

The present invention provides a data accessing method for enhancing data accessing efficiency.

The present invention provides a data accessing method used in a memory unit of a general data access system. In the invention, a continuous data with a continuous logical address is configured to different memory ranks.

A memory space configuring method in the present invention includes: dividing a data to a plurality of blocks, each block has corresponding logical address. Then, configuring the blocks in turn to each of the memory ranks, wherein the continuous blocks with continuous logical addresses are configured to the different memory ranks The following description of an embodiment comprises a method for forming an interleaving control code and distributing the continuous data. Both the distribution and the size of distributed data block have many variations, so they can be adjusted to adapt to the practical requirements and are not to be limited by the embodiment. After the processes for decoding the interleaving control code and the logical address code, a physical location can be obtained and then the desired data can be accessed.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
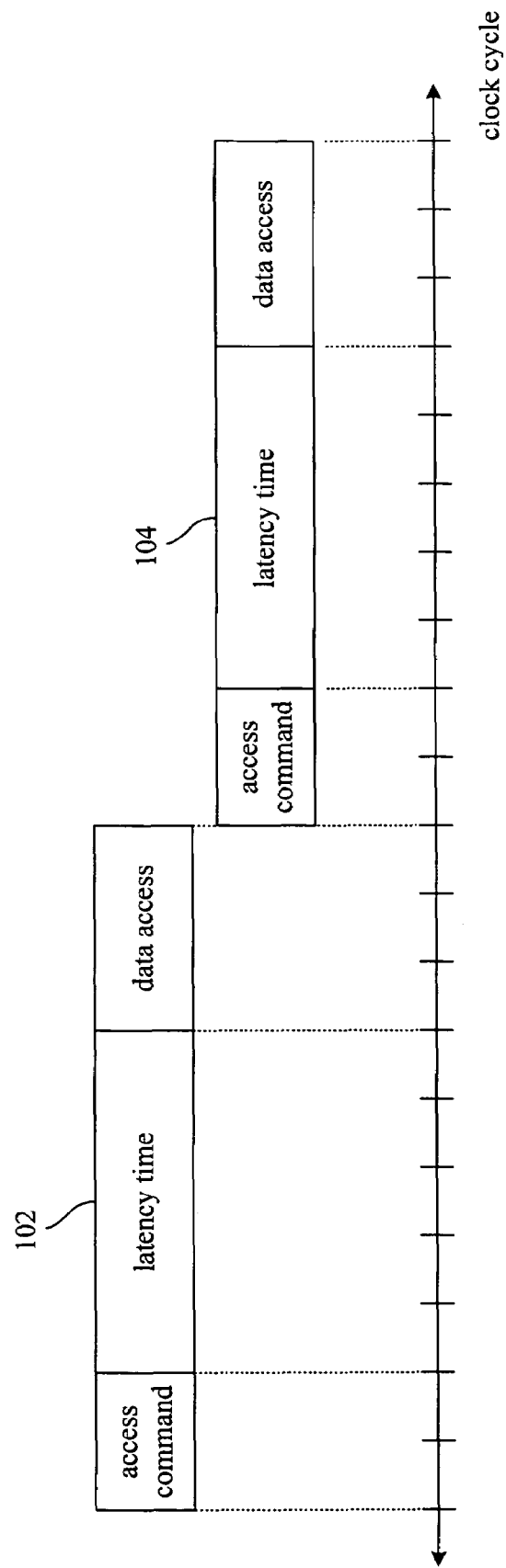
FIG. 1 is a timing diagram showing the clock cycles spent for accessing memory by a conventional method.

Reference will now be made in detail to the present preferred embodiments of the invention, examples of which are illustrated in the accompanying drawings. Wherever possible, the same reference numbers are used in the drawings and the description to refer to the same or like parts.

In accordance with the conventional data storing method, the continuous data (e.g. program codes of the same application program) are generally stored into a continuous memory location. That is to say, even if the memory unit comprises many memory ranks, these continuous data may very likely be stored into the same memory rank. Thus, an accessible data quantity in a continuous access operation is limited by the size of the memory page in a memory rank. If a desired data quantity in the access operation is exceeding the memory page size, the utility rate of the data bus will be widely degraded due to the frequently pre-charging of the old memory page and activating the new memory page.

Figure 2:
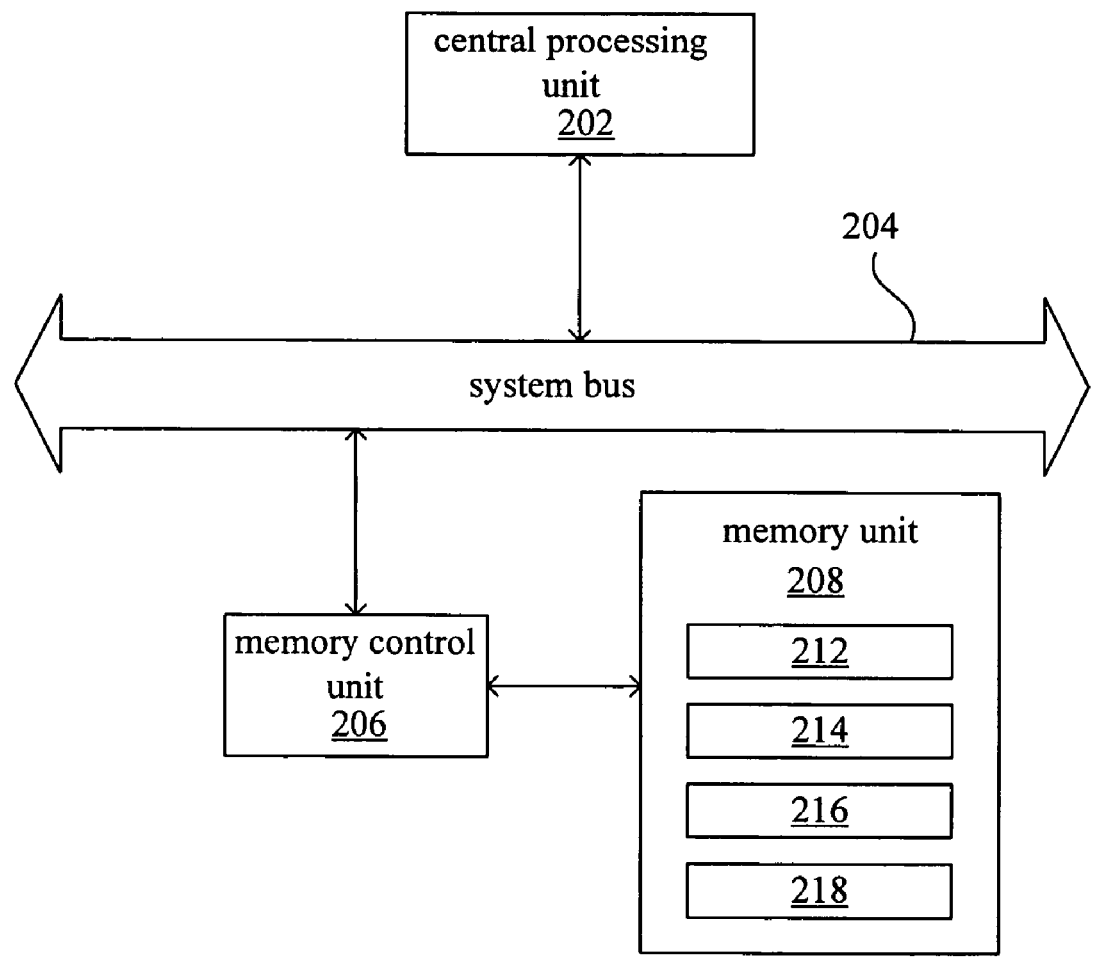
FIG. 2 is a block diagram of a data access system.

FIG. 2 shows a block diagram of a data access system, wherein a central processing unit 202 sends a request to a memory control unit 206 via a system bus 204 for data accessing. After the memory control unit receives the request, the data will be readout from or written into a physical location of a memory unit 208 according to a logical address signal transmitted from the central processing unit 202. Therefore, the memory control unit 206 is able to map a logical address to a physical address of the memory.

This embodiment assumes that a memory system formed by the memory control unit 206 and the memory unit 208 is a Synchronous DRAM (SDRAM) module or a Double Data Rate (DDR) SDRAM module. A memory rank of a SDRAM module is formed by a plurality of memory banks, and each memory bank can activate one memory page at one time. Size of one memory page may be 4 KB to 32 KB depending on the characteristic of the memory unit. If a memory rank has four memory banks and size of a memory page is 32 KB, there is 128 KB data that can be simultaneously activated at most. That is to say, if two memory ranks can be access at one time, there has 256 KB data that can be simultaneously activated, and so on.

This embodiment assumes that the memory unit 208 has four memory ranks namely memory rank 212-218.

Assuming the memory size of the memory rank 212 is 256 MB, the memory rank 214 is blank, and the memory size of both the memory rank 216 and memory rank 218 are 128 MB. That is to say, the total memory size of the memory unit 208 for data accessing is 512 MB. Therefore, the system uses 29 bits {A28, A27, . . . ,A1, A0} for addressing the logical address.

In general, the memory addresses are assigned by a linear distribution in the conventional memory address mapping method. In this embodiment, memory space of memory rank 212 is addressed from logical address 0 MB to logical address 256 MB; memory space of memory rank 216 is address from logical address 256 MB to logical address 384 MB; and memory space of memory rank 212 is addressed from logical address 384 MB to logical address 512 MB Assuming bits {A28, A27} of logical address can be used to determine which one of memory rank is mapped. If a data which bits {A28, A27} of logical address is {0, 0} or {0, 1}, thus, the data is mapped to the memory rank 212. If a data which bits {A28, A27} of logical address is {1, 0}, thus, the data is mapped to the memory rank 216. And if a data which bits {A28, A27} of logical address is {1, 1}, thus the data is mapped to the memory rank 218. Besides, bits {A26, A25, . . . ,A1, A0} of logical address is used to determine the physical location of the mapped memory rank.

For example, an application program needs to occupy 64 MB memory space herein, thus a continuous logical address will be allocated for the application program. At that time, if the logical address of the application program is directly mapped to a physical address, the 64 MB application program will very likely be stored into one of memory rank 212, memory rank 216 or memory rank 218. Thus, only 128 KB of memory pages is activated by the application program at one time, and then the access efficiency of the memory unit is degraded.

In the present invention, the application program with 64 MB memory size is divided and respectively allocated to the memory rank 212, memory rank 216 and memory rank 218, therefore size of memory page accessing at one time is increase.

In this embodiment, the data is equally allocated to the memory rank 212, memory rank 216 and memory rank 218; therefore, at least two bits of logical address is used to being as an interleaving control code for determining the objective memory rank between the three memory ranks 212, 216 and 218.

The bits {A18, A17} of logical address of each data is regarded as the interleaving control code herein. Nevertheless, an interleaving control code may be formed by any bits of the logical address in practice, and it is not limited to this embodiment. This embodiment assumes that if a data with bits {A18, A17} equals to {0,0} or {0,1} is mapped to the memory rank 212; if a data with bits {A18, A17} equals to {1,0} is mapped to the memory rank 216; and if a data with bits {A18, A17} equals to {1,1} is mapped to the memory rank 218.

Figure 3A:
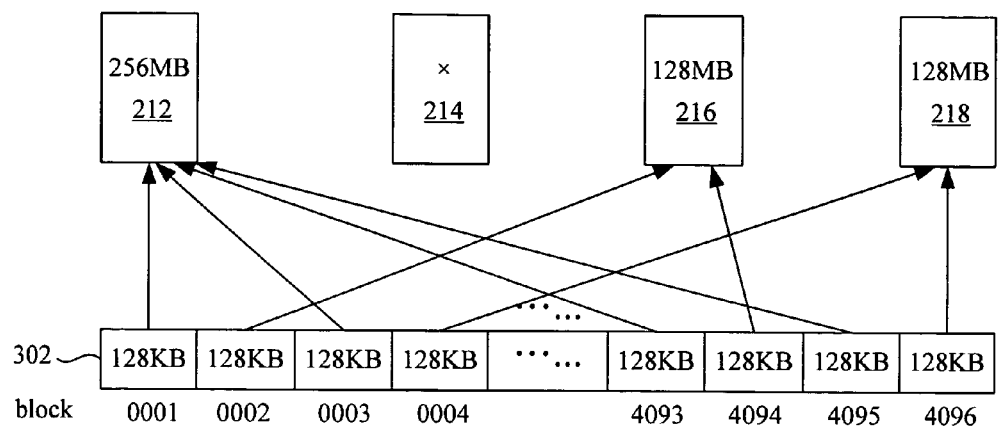
FIG. 3A is a distribution diagram of the memory blocks according to an embodiment of the present invention.

FIG. 3A shows a memory space configuration method of the present invention. A 512 MB memory space 302 is divided 4096 blocks, wherein each block is 128 KB (assuming that there are four memory banks in per memory rank, and each of the memory banks is able to activate a memory page of 32 KB at one time.) The block 0001 to the block 0004 are allocates to memory rank 212, memory rank 216, memory rank 212 and memory rank 218 in turn. Also, the rest blocks are sequentially allocated to each memory rank in the same manner. Consequently, the continuous data block with continuous logical address will not be allocated to identical memory rank.

After determining the objective memory rank, physical address of the data in the objective memory rank can be figured out by decoding the logical address of the data. Because the bits {A18, A17} are used as the interleaving control code, in the embodiment, using higher order bits such as bits {A28, A27} to replace the bits {A18, A17}. That is to say, the physical address of the data in the objective memory rank to can be obtained by decoding logical address {A25, A24, . . . ,A19, A28, A27, A16, . . . ,A1, A0}. Finally, the data can be accessed at the physical address in the objective memory rank.

Figure 3B:
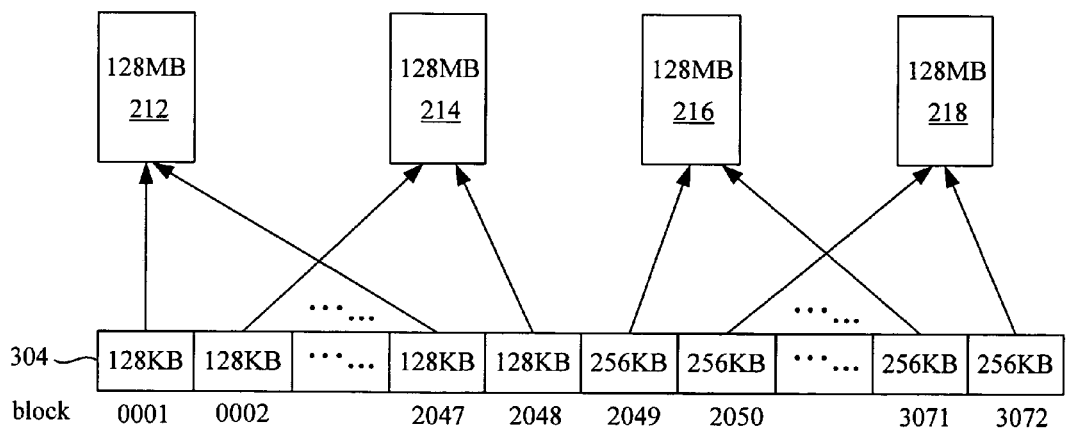
FIG. 3B is a distribution diagram of the memory blocks according to an embodiment of the present invention.

FIG. 3B shows another embodiment according to the present invention. The only difference between the examples shown in FIG. 3A and FIG. 3B is that the memory size of the memory rank 212 is 128 MB and the memory size of the memory rank 214 is also 128 MB.

In this embodiment, logical address 0M to 256 MB of the memory space 304 is shared by the memory rank 212 and memory rank 214 forming a memory group X; and logical address 256M to 512 MB of the memory space 304 is shared by the memory rank 216 and memory rank 218 forming a memory group Y.

Assuming bit {A17} of the logical address is selected to be the interleaving control code of the memory group X. That is, if a data with bit {A17} equals to {0} will be mapped to the memory rank 212; and if a data with bit {A1 7} equals to {1 } will be mapped to the memory rank 214. Assuming bit {A18} of the logical address is selected to be the interleaving control code of the memory group Y. If a data with bit {A18} equals to {0} will be mapped to the memory rank 216; and if a data with bit {A18} equals to {1} will be mapped to the memory rank 218. Thus, the configuration of the memory space 304 with 512 MB is shown in FIG. 3B.

In which, blocks 0001 to 2048 are equally configured to the memory rank 212 and memory rank 214 in turn at first, and then blocks 2049 to 3072 are equally configured to the memory rank 216 and memory rank 218 in turn. Assuming memory size of each block 0001 to the block 2048 is 128 KB, and the memory size of each block 2049 to the block 3072 is 256 KB. Finally, the substitutive logical address can be formed by respectively replacing bit {A17} in the memory group X and bit {A18} in the memory group Y with bit {A28} to obtain the physical address.

According to the foregoing description, the numbers of the interleaving level and grouping of the present invention can be programable.

Figure 4:
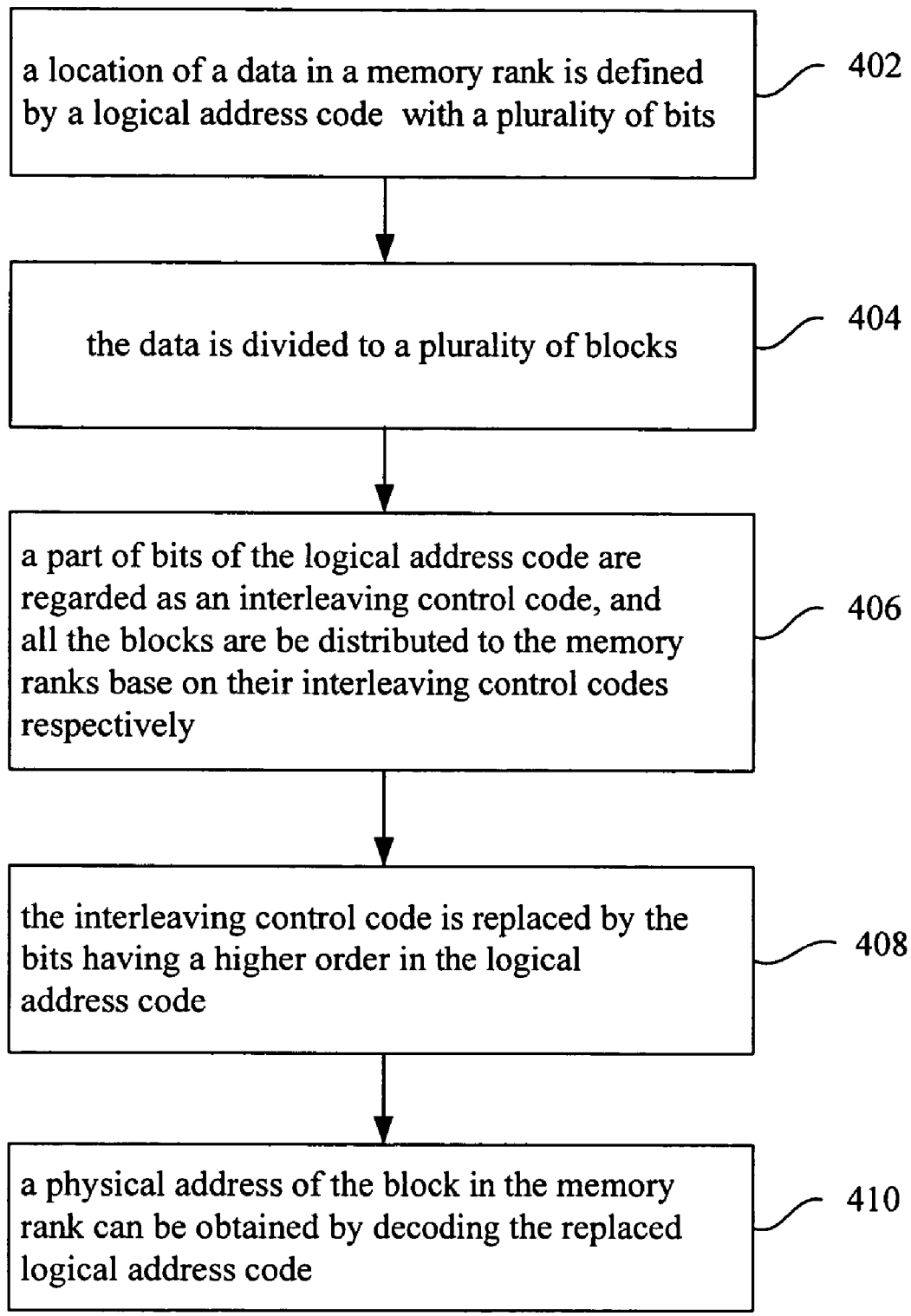
FIG. 4 is a flow chart of the method in accordance with an embodiment of the present invention.

FIG. 4 shows a flow chart of the method in accordance with the present invention. In step 402, objective memory rank of a data is defined by a logical address with a plurality of bits, wherein the number of bits of the logical address is determined by the memory size. In step 404, the data is divided to a plurality of blocks, and each block has a corresponding logical address. In step 406, a part of bits of the logical address are regarded as interleaving control code, and all the blocks are distributed to each memory rank according to their interleaving control codes respectively. The bit numbers of the interleaving control code is according to block size. In step 408, the interleaving control code is replaced by the higher order bits in the logical address. In step 410, a physical address of the block in the memory rank can be obtained by decoding the replaced logical address.

In the present invention, bits of interleaving control code can be random selected and is not limited to the adjacent bits.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory space configuring method, wherein said memory space is formed by a plurality of memory ranks, the method comprising:
   dividing said data to a plurality of blocks, wherein each block has a corresponding logical address defined with a plurality numbers of bits;
   selecting at least one bit of the logical address for being as an interleaving control code; and
   configuring the blocks to each of the memory ranks according to the interleaving control code,
   wherein the blocks with continuous logical addresses are configured to different memory ranks.

2. The method of claim 1, wherein block size of the blocks is identical and is determined by types of the memory ranks.

3. The method of claim 2, if said memory rank has four memory banks and each said memory rank is able to activate a 32 KB memory page at a time, said block size is 128 KB.

4. The method of claim 1, wherein equally configuring the blocks into each the memory ranks according to memory rank size.

5. The method of claim 1, wherein the number of bits is determined by said memory space.

6. The method of claim 1, wherein the number of bits of said interleaving control code is determined by said data size.

7. The method of claim 1, the method further comprises grouping the memory ranks into at least one memory group, wherein the blocks are respectively configured to each said memory rank of said memory group.

8. The method of claim 1, the method further comprises replacing said interleaving control code by higher order bits of said logical address; and then decoding said logical address for obtaining a physical address of said block in said memory ranks.

9. The method of claim 1, wherein said memory ranks are a Synchronous DRAM (SDRAM) module or a Double Data Rate (DDR) SDRAM module.

10. A method for accessing a memory, wherein said memory is formed by a plurality of memory ranks, the method comprising:
    dividing said data into at least one block, wherein said block has a corresponding logical address defined with a plurality number of bits;
    selecting at least one bit of said logical address of said block for being as an interleaving control code;
    configuring said block to one of the memory ranks according to said interleaving control code of said block;
    replacing said interleaving control code by higher order bits of said logical address of said block; and
    decoding said logical address for obtaining a physical address of said block in said memory rank.

11. The method of claim 10, wherein block size of said block is identical and is determined by types of the memory ranks.

12. The method of claim 11, if said memory rank has four memory banks and each said memory rank is able to activate a 32 KB memory page at a time, said block size is 128 KB.

13. The method of claim 10, the method further comprises configuring the blocks with continuous logical addresses into different memory ranks.

14. The method of claim 10, wherein the number of said bits is determined by space size of said memory.

15. The method of claim 10, wherein the number of bit of said interleaving control code is determined by data size.

16. The method of claim 10, further comprising grouping the memory ranks into at least one memory group, wherein the blocks are respectively configured to each said memory rank of said memory group.

17. The method of claim 10, wherein said memory ranks are a Synchronous DRAM (SDRAM) module or a Double Data Rate (DDR) SDRAM module.

* * * * *